US010822089B2

(12) United States Patent
Koyama et al.

(10) Patent No.: US 10,822,089 B2
(45) Date of Patent: Nov. 3, 2020

(54) WASTE BIN DEVICE OF AIRCRAFT LAVATORY UNIT

(71) Applicant: The Yokohama Rubber Co., LTD., Tokyo (JP)

(72) Inventors: Takashi Koyama, Hiratsuka (JP); Yuji Taguchi, Hiratsuka (JP)

(73) Assignee: The Yokohama Rubber Co., LTD. (JP)

( * ) Notice: Subject to any disclaimer, the term of this patent is extended or adjusted under 35 U.S.C. 154(b) by 424 days.

(21) Appl. No.: 15/757,306

(22) PCT Filed: Jul. 14, 2016

(86) PCT No.: PCT/JP2016/070818
§ 371 (c)(1),
(2) Date: Mar. 2, 2018

(87) PCT Pub. No.: WO2017/043177
PCT Pub. Date: Mar. 6, 2017

(65) Prior Publication Data
US 2018/0265202 A1    Sep. 20, 2018

(30) Foreign Application Priority Data
Sep. 10, 2015 (JP) .................. 2015-178314

(51) Int. Cl.
*B64D 11/02* (2006.01)
*B65F 1/14* (2006.01)
(Continued)

(52) U.S. Cl.
CPC ............... *B64D 11/02* (2013.01); *A62C 3/08* (2013.01); *B65F 1/1426* (2013.01);
(Continued)

(58) Field of Classification Search
CPC ....... B64D 11/02; B64D 11/04; B65F 1/1426; A62C 3/08
See application file for complete search history.

(56) References Cited

U.S. PATENT DOCUMENTS 3,866,861 A * 2/1975 Ratcliff .................. B64D 11/00
244/118.5
4,573,650 A * 3/1986 Clayton .................. B64D 11/02
244/1 R
(Continued)

FOREIGN PATENT DOCUMENTS

EP    2 695 812    2/2014
EP    2 818 411    12/2014
(Continued)

OTHER PUBLICATIONS

International Search Report for International Application No. PCT/JP2016/070818 dated Oct. 11, 2016, 4 pages, Japan.

*Primary Examiner* — Brian M O'Hara
(74) *Attorney, Agent, or Firm* — Thorpe North & Western

(57) ABSTRACT

A waste bin device of an aircraft lavatory unit is provided. A chute, waste flap, and waste container are formed from a material having fire resistance performance. A fire spreading prevention space that prevents fire from spreading to the outside of a waste bin device main body due to a flame occurring when inserted waste catches fire is formed inside the waste bin device main body at a storing position of the waste container positioned with regard to a lower portion of the chute. A maintaining portion maintains the waste container at a storing position. The maintaining portion includes a first maintaining portion that maintains from a vertical direction a condition where an upper portion of the waste container and lower portion of the chute are aligned, and a
(Continued)

second maintaining portion that maintains the condition from a direction orthogonal to the vertical direction, at the storing position.

14 Claims, 11 Drawing Sheets

(51) Int. Cl.
  *A62C 3/08* (2006.01)
  *B65F 1/16* (2006.01)
(52) U.S. Cl.
  CPC .......... *B65F 1/1431* (2013.01); *B65F 1/1646* (2013.01); *B65F 2001/1494* (2013.01); *Y02T 50/46* (2013.01)

(56) References Cited

U.S. PATENT DOCUMENTS

| | | | |
|---|---|---|---|
| 7,741,801 | B2 | 6/2010 | Fukuizumi |
| 9,415,873 | B2 * | 8/2016 | McIntosh ............... B64D 11/04 |
| 2004/0227034 | A1 | 11/2004 | Wentland et al. |
| 2014/0041110 | A1 | 2/2014 | Dannenberg |
| 2015/0298809 | A1 | 10/2015 | Minegishi et al. |

FOREIGN PATENT DOCUMENTS

| | | |
|---|---|---|
| JP | H05-048799 | 6/1993 |
| JP | H08-081004 | 3/1996 |
| JP | 3133875 | 7/2007 |
| WO | WO 2004/076279 | 9/2004 |
| WO | WO 2013/125230 | 8/2013 |

\* cited by examiner

WASTE BIN DEVICE OF AIRCRAFT LAVATORY UNIT

TECHNICAL FIELD

The present technology relates to a waste bin device of an aircraft lavatory unit.

BACKGROUND ART

Aircraft lavatory units are provided with a body frame where a lavatory chamber is provided, and a waste bin device is disposed in addition to a washbasin and toilet bowl in the lavatory chamber.

The waste bin device is provided with a waste bin device main body having: a chute where a waste inserting opening is formed; a waste flap where the waste inserting opening opens and closes; and a waste container with a rectangular cross section, where waste inserted from a waste inserting port is stored and can be removed to the outside of a storage chamber.

The waste bin device main body is stored in the storage chamber partitioned by a wall portion inside the lavatory chamber, and a fire extinguisher is attached to the chute.

Furthermore, of the wall portion partitioning the storage chamber, the waste inserting port corresponding to the waste inserting opening is formed on an upper portion of a wall portion rising from a floor portion of the lavatory chamber. Furthermore, a portion of the wall portion positioned below the waste inserting port is configured as an opening and closing plate opening and closing the storage chamber such that the waste container can be removed to the outside of the storage chamber.

Conventionally, the chute and waste flap are formed from a material having fire resistance performance, in order to satisfy Fire Containment Requirements of FAR (U.S. Federal Aviation Regulations) 25.853. Furthermore, inside the storage chamber, rectangular side plates having fire resistance performance are suspended from three sides of a rectangular bottom plate portion of the chute, and lower edges of the three side plates are connected by one bottom plate having fire resistance performance, and thus a space for placing an opened waste container is formed on an opening and closing plate side by the three side plates and one bottom plate.

Furthermore, one back plate having fire resistance performance is provided on a back surface of the opening and closing plate, and the storage chamber is closed by the opening and closing plate, and therefore, a fire spreading prevention space that prevents fire from spreading due to a flame occurring when waste inserted in the waste container catches fires is formed by the three side plates suspending from three sides of the bottom plate portion of the chute, one bottom plate connecting the lower edges of the side plates, one back plate provided on the back surface of the opening and closing plates, chute, and waste container, such that the waste container is disposed in the fire spreading prevention space.

Therefore, apart from the waste container storing waste, a total of five plate materials including the three side plates, one bottom plate, and one back plate must be used in order to form the fire spreading prevention space, and a double structure of a plate material configuring the waste container and a plate material forming the fire spreading prevention space is formed below the chute, and thus the number of components increases, which is disadvantageous from the perspective of reducing the weight of the lavatory unit.

SUMMARY

The present technology provides a waste bin device of an aircraft lavatory unit, which is advantageous from the perspective of having a reduced number of components to reduce the weight of the lavatory unit.

The present technology is a waste bin device of an aircraft lavatory unit, including a waste bin device main body having: a chute stored in a storage chamber of the aircraft lavatory unit, where a waste inserting opening is formed at a location corresponding to a waste inserting port of a wall portion partitioning the storage chamber; a waste flap that enables opening and closing of the waste inserting opening, and is biased in a direction of closing the waste inserting opening; and a waste container disposed at a location where waste inserted from the waste inserting port is stored below the chute; wherein the chute, waste flap, and waste container are formed having fire resistance performance, the chute is maintained inside the storage chamber, a fire spreading prevention space that prevents fire from spreading to the outside of the waste bin device main body due to a flame occurring when waste inserted in the waste container catches fire is formed inside the waste bin device main body at a storing position of the waste container where an upper portion of the waste container is positioned with regard to a lower portion of the chute, and a maintaining portion that maintains the waste container at the storing position is provided.

With the waste bin device of an aircraft lavatory unit, the fire spreading prevention space is formed only by the waste bin device main body, and therefore, a conventional plate material for forming the fire spreading prevention space disposed on an outer side of the waste container can be omitted, and the number of components can be reduced, and thus an aircraft lavatory unit which is advantageous from the perspective of achieving a reduction in weight can be obtained.

DETAILED DESCRIPTION

First Embodiment

Figure 1:
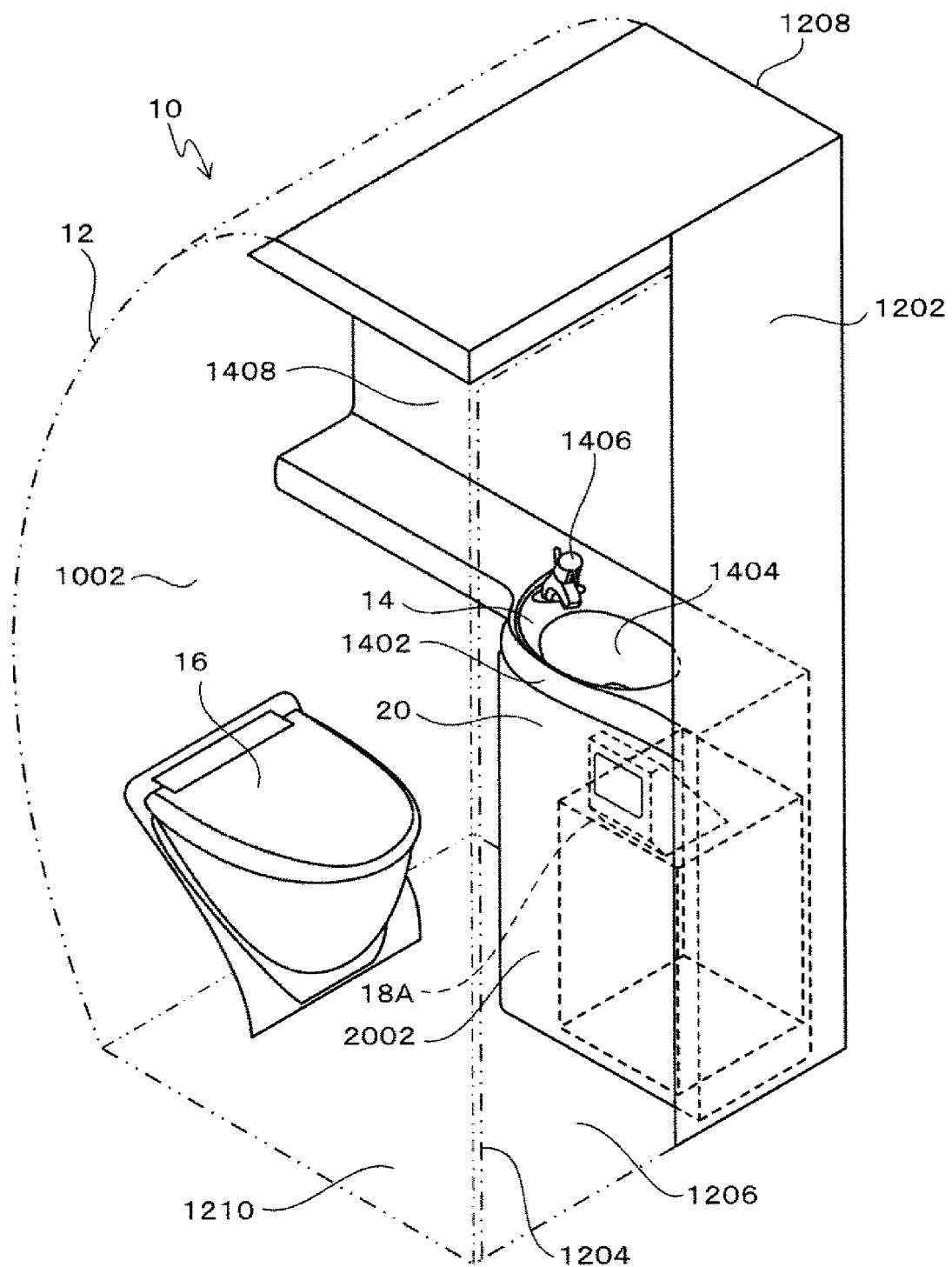
FIG. 1 is a perspective view of a lavatory unit according to a first embodiment.

Next, embodiments of the present technology will be described while referring to the drawings.

First, a first embodiment will be described while referring to FIG. 1 to FIG. 6.

As illustrated in FIG. 1, a lavatory unit 10 has a body frame 12 installed on a floor of an aircraft, and a lavatory chamber 1002 is formed inside the body frame 12.

A doorway 1204 is provided on a front surface wall 1202 of the lavatory chamber 1002, and the doorway 1204 opens and closes by a door 1206.

A washbasin 14, toilet bowl 16, and waste bin device 18A are disposed in the lavatory chamber 1002.

The toilet bowl 16 is disposed in front of a rear surface wall, and the washbasin 14 is provided on an upper surface of a base 20 installed on a bottom wall 1210 of the lavatory chamber 1002 on an inner side of a side wall 1208. The washbasin 14 is configured to include a counter 1402, hand-wash basin 1404, faucet 1406, and mirror 1408.

Figure 2:
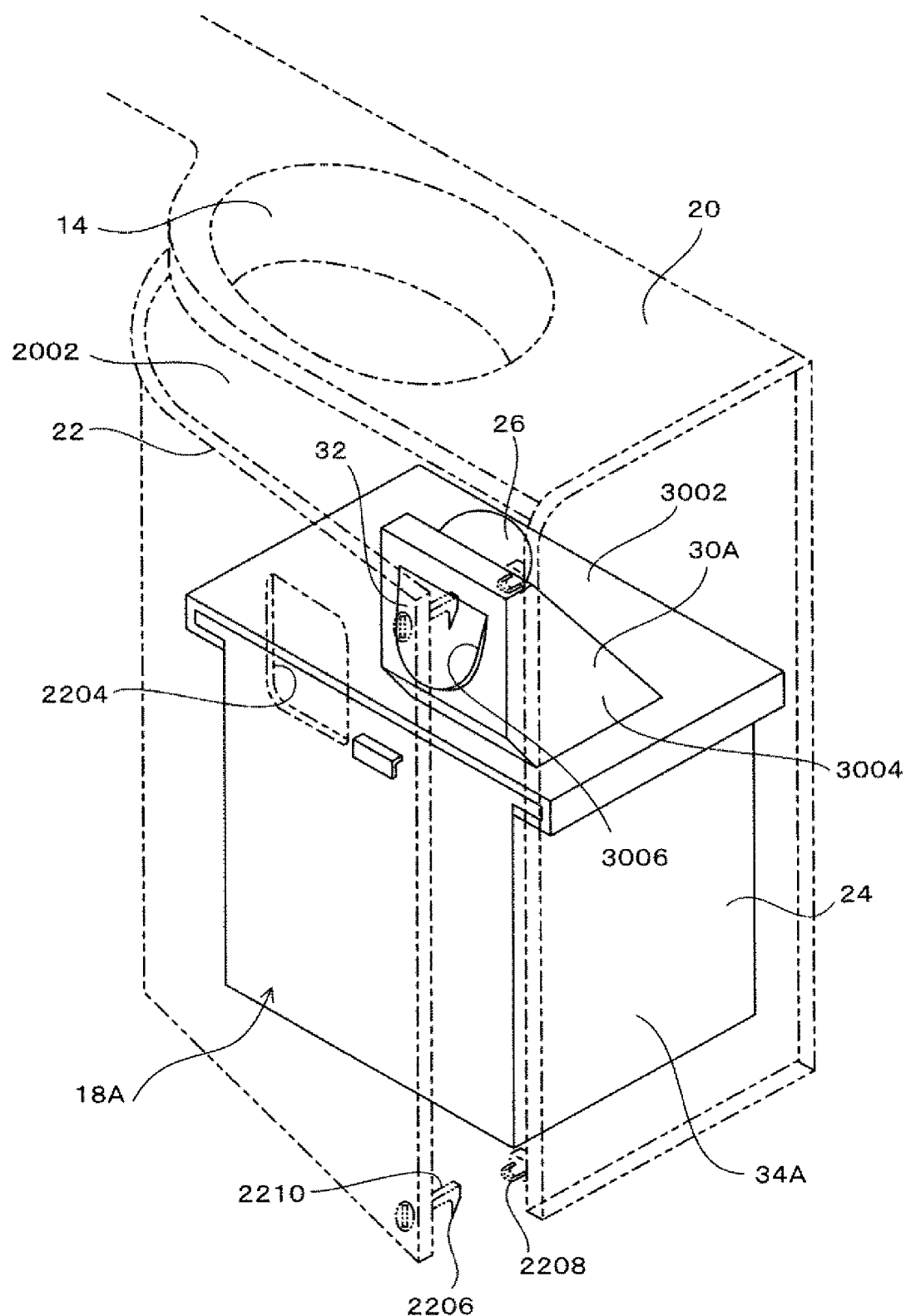
FIG. 2 is a perspective view of a waste bin device according to the first embodiment.

As illustrated in FIG. 2, a storage chamber 2002 where the waste bin device 18A is stored is formed inside the base 20.

Figure 5:
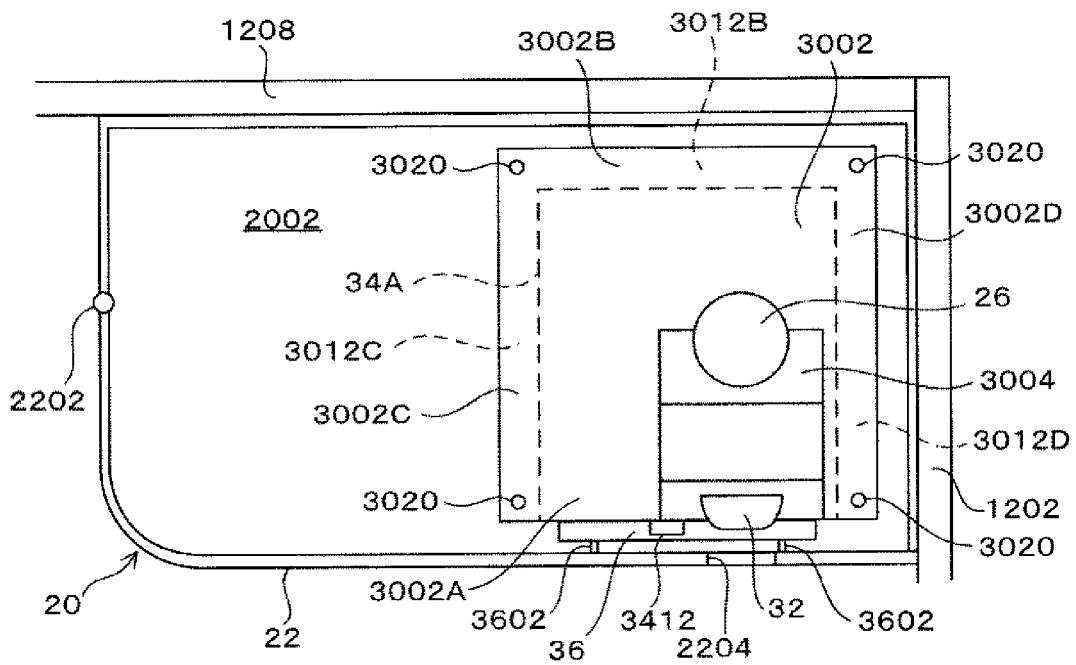
FIG. 5 is a plan view of the waste bin device according to the first embodiment.

Of wall portions partitioning the storage chamber 2002, a portion extending downward from the upper surface of the base 20 is provided as an opening and closing plate 22 that opens and closes the storage chamber 2002, and as illustrated in FIG. 5, the opening and closing plate 22 pivots around a hinge 2202 as a fulcrum.

A waste inserting port 2204 is formed on the opening and closing plate 22.

Furthermore, as illustrated in FIG. 2, an engaging and disengaging mechanism 2210 where a latch 2206 on an opening and closing plate 22 side engages with a striker 2208 on a base 20 side is provided on the opening and closing plate 22 in a condition where the storage chamber 2002 is closed, and thus the opening and closing plate 22 is not a structure that can be easily opened in order to prevent mischief and terrorism.

Figure 3:
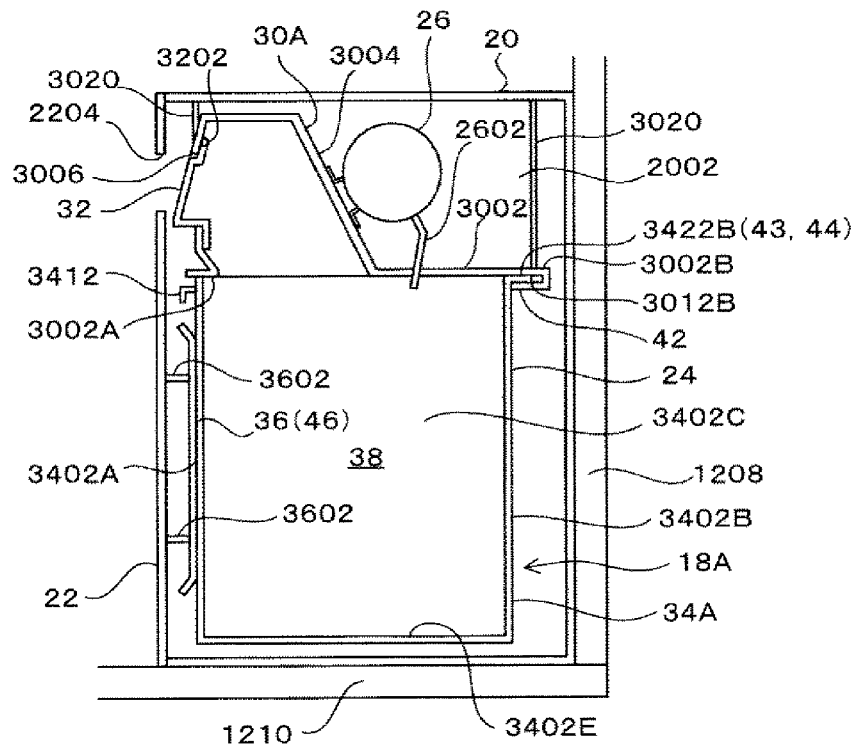
FIG. 3 is a cross-sectional side surface view of the waste bin device according to the first embodiment.
Figure 4:
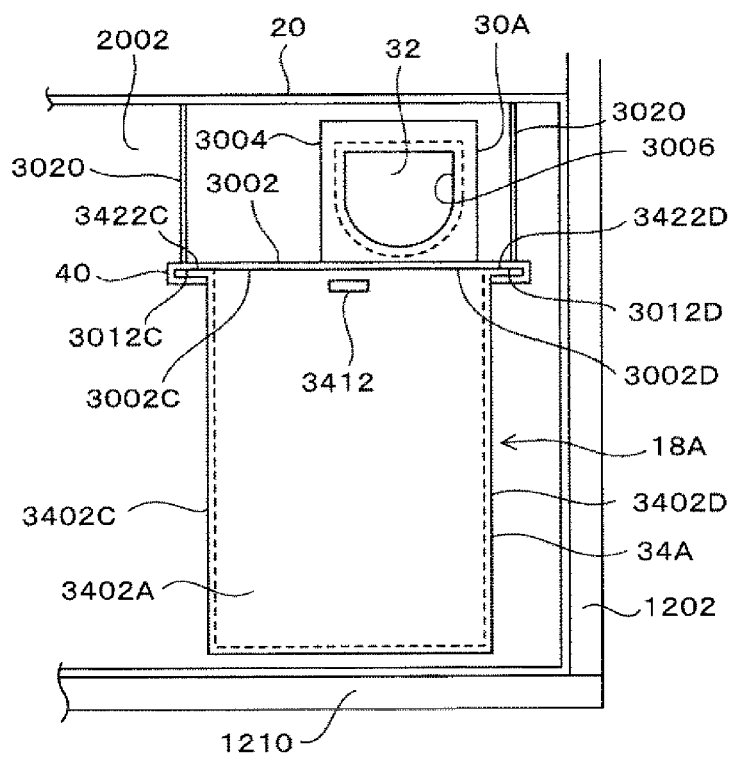
FIG. 4 is a front surface view of the waste bin device according to the first embodiment.

As illustrated in FIG. 3 to FIG. 5, a waste bin device main body 24 is provided with a chute 30A, waste flap 32, and waste container 34A. A fire spreading prevention space 38 (refer to FIG. 3) described later is formed inside the waste bin device main body 24.

Furthermore, the waste bin device 18A is provided with a fire extinguisher 26 and maintaining portion 43 in addition to the waste bin device main body 24.

The maintaining portion 43 maintains the waste container 34A at a storing position of the waste container 34A where an upper portion of the waste container 34A is positioned with regard to the lower portion of the chute 30A.

The maintaining portion 43 is configured to include a first maintaining portion 44 that maintains from a vertical direction a condition where the upper portion of the waste container 34A and lower portion of the chute 30A are aligned (refer to FIG. 3), and a second maintaining portion 46 that maintains the condition from a direction orthogonal to the vertical direction (refer to FIG. 3), at the storing position of the waste container 34A.

The chute 30A, waste flap 32, and waste container 34A are formed from a material having fire resistance performance, and examples of the material that can be used include metal materials typified by aluminum and stainless steel, flame retardant resins, and the like.

The chute 30A has a rectangular bottom plate portion 3002 and a protruding portion 3004 projecting from the bottom plate portion 3002, and a waste inserting opening 3006 is formed at a location of the protruding portion 3004 corresponding to the waste inserting port 2204.

The chute 30A is maintained inside the storage chamber 2002. In the present embodiment, the chute 30A is maintained by a plurality of supporting members 3020 provided between four corners of the bottom plate portion 3002 and an upper plate of the storage chamber 2002, but for example, various structures can be used in maintaining the chute 30A, such as connecting the bottom plate portion 3002 to a wall surface inside the storage chamber 2002 through a flange to maintain the chute 30A, or the like.

The fire extinguisher 26 is provided on the protruding portion 3004.

The fire extinguisher 26 sprays a fire-extinguishing agent from a spray nozzle 2602 into the waste bin device main body 24 at a set temperature or higher. A chlorofluorocarbon gas, halon gas, or other conventionally known inert gas can be used as the fire-extinguishing agent, and a commercially available product can be used as the fire extinguisher 26.

As illustrated in FIG. 5, the bottom plate portion 3002 has a front side 3002A disposed at a location near the opening and closing plate 22 which is a wall portion partitioning the storage chamber 2002, a rear side 3002B opposite from the front side 3002A, and a left side 3002C and right side 3002D connecting the front sides 3002A and rear side 3002B.

An opened rear recessed groove 3012B, left recessed groove 3012C, and right recessed groove 3012D are formed extending to an inner side below the bottom plate portion 3002 along the remaining three sides excluding the front side 3002A of the bottom plate portion 3002, and the bottom plate portion 3002 is configured to include the rear recessed groove 3012B, left recessed groove 3012C, and right recessed groove 3012D.

The waste flap 32 opens and closes the waste inserting opening 3006, and therefore, as illustrated in FIG. 3, the flap is provided via a hinge 3202 at a location of a protruding portion above the waste inserting opening 3006, and is biased in a direction closing the waste inserting opening 3006 by a spring (not illustrated in the drawings).

When waste is inserted into the waste inserting port 2204, the waste flap 32 opens and the waste is stored inside the waste container 34A from the waste inserting opening 3006.

The waste container 34A is disposed at a storing position positioned with regard to the lower portion of the chute 30A, and at the storing position of the waste container 34A, waste inserted from the waste inserting port 2204 is stored inside the container and can be removed to the outside of the storage chamber 2002.

At least the upper portion of the waste container 34A is formed into a shape corresponding to the bottom plate portion 3002 of the chute 30A, and in the present embodiment, the waste container 34A has a rectangular cross section and has a uniform shape in the vertical direction.

Note that if the shape of the bottom plate portion 3002 of the chute 30A is semi-circular, at least the upper portion of the waste container 34A is also semi-circular, and the shape of the bottom plate portion 3002 of the chute 30A and waste container 34A is not restricted to a rectangular shape, and may be a shape other than a rectangular shape. The same is true for other embodiments with regard to changes in the shape.

Furthermore, a cross-sectional shape of the waste container 34A is not required to be uniform in the vertical direction, and in order to avoid interference with equipment disposed in the storage chamber 2002, it is optional that a recessed portion recessed on an inner side of the waste container 34A is provided on a lower portion the waste container 34A or the like. The same is true for other embodiments.

Figure 6:
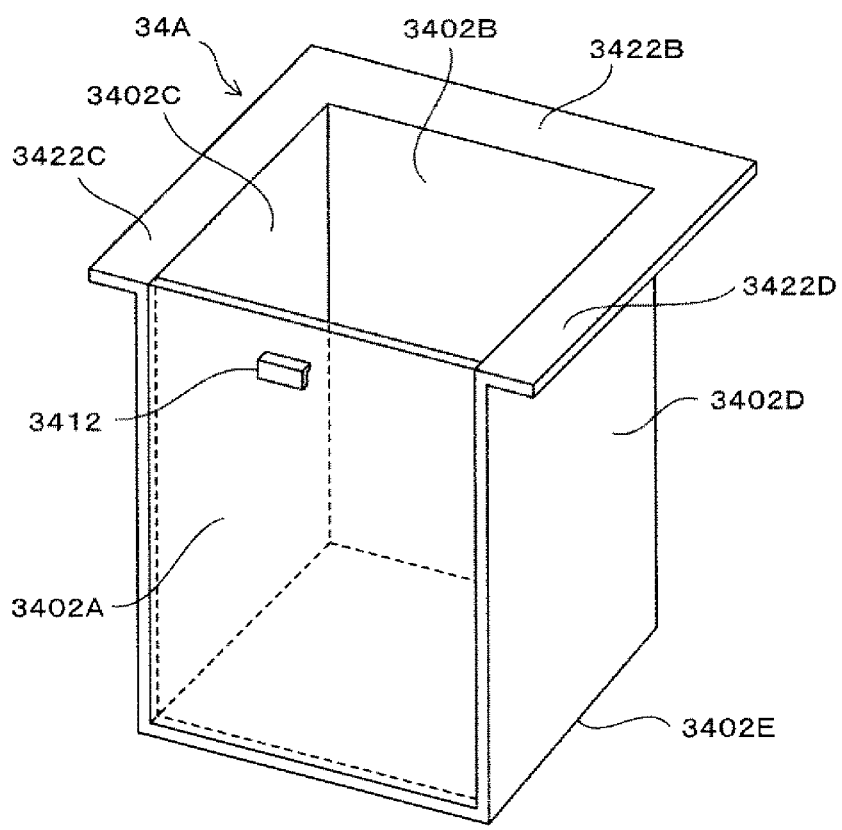
FIG. 6 is a perspective view of a waste container according to the first embodiment.

As illustrated in FIG. 6, the waste container 34A has a front surface 3402A disposed at a location near the opening and closing plate 22 which is a wall portion partitioning the storage chamber 2002, a rear surface 3402B opposite from the front surface 3402A, a left side surface 3402C and right side surface 3402D connecting the front surface 3402A and rear surface 3402B, and a bottom surface 3402E connecting lower ends of the four side surfaces.

A drawer handle 3412 is provided on the front surface 3402A.

A rear flange 3422B, left flange 3422C, and right flange 3422D that detachably engage with the rear recessed groove 3012B, left recessed groove 3012C, and right recessed groove 3012D are formed along upper edges of three remaining side surfaces excluding the front surface 3402A.

As illustrated in FIG. 3, a pressing plate 36 that presses the front surface 3402A of the waste container 34A and presses an upper end of the rear surface 3402B of the waste container 34A onto a portion of the chute 30A forming the rear recessed groove 3012B is provided on a back surface of the opening and closing plate 22 positioned on a storage chamber 2002 side in a condition where the storage chamber 2002 is closed by the opening and closing plate 22.

The pressing plate 36 supports tip portions of a plurality of rods 3602 attached to the back surface of the opening and closing plate 22.

Removal and insertion of the waste container 34A into the storage chamber 2002 will be described.

First, a case where the waste container 34A is inserted into the storage chamber 2002 will be described.

The engaging and disengaging mechanism 2210 is released to open the opening and closing plate 22, the rear surface 3402B is faced toward the storage chamber 2002, and the waste container 34A is pressed into the storage chamber 2002 while inserting the left flange 3422C and right flange 3422D into the left recessed groove 3012C and right recessed groove 3012D.

Eventually, the rear flange 3422B is inserted into the rear recessed groove 3012B, a portion of the chute 30A forming the rear recessed groove 3012B contacts an upper end of the rear surface 3402B of the waste container 34A, and the waste container 34A reaches the storing position.

At the storing position of the waste container 34A, an upper end of the front surface 3402A of the waste container 34A is aligned with a lower surface of the front side 3002A of the bottom plate portion 3002 of the chute 30A. In other words, at the storing position of the waste container 34A, an upper end of the front surface 3402A of the waste container 34A contacts or nearly contacts a lower surface of the front side 3002A of the bottom plate portion 3002 of the chute 30A. "Nearly contacts" herein means that the upper end of the front surface 3402A of the waste container 34A is opposite with regard to the lower surface of the front side 3002A of the bottom plate portion 3002 of the chute 30A, having sufficient air tightness in order to satisfy Fire Containment Requirements of FAR (U.S. Federal Aviation Regulations) 25.853.

The fire spreading prevention space 38 (refer to FIG. 3) that prevents fire from spreading to the outside of the waste bin device main body 24 due to a flame occurring when waste inserted in the waste bin device main body 24 catches fire is formed inside the waste bin device main body 24 at the storing position of the waste container 34A.

Next, the storage chamber 2002 is closed by the opening and closing plate 22.

When the storage chamber 2002 is closed by the opening and closing plate 22, the pressing plate 36 presses the front surface 3402A of the waste container 34A, and when a closed condition of the storage chamber 2002 by the opening and closing plate 22 is maintained by the engaging and disengaging mechanism 2210, a condition where the portion of the chute 30A forming the rear recessed groove 3012B and upper end of the rear surface 3402B of the waste container 34A contact is maintained by the pressing plate 36.

Removal of the waste container 34A from the storage chamber 2002 is performed by releasing the engaging and disengaging mechanism 2210 to open the opening and closing plate 22, and then pulling the waste container 34A frontward.

In the first embodiment, a first positioning portion 40 (refer to FIG. 4) that can contact a portion in a direction orthogonal to a direction where the waste container 34A is removed and inserted with regard to the storage chamber 2002 and that positions the waste container 34A in the direction orthogonal to the direction where the waste container 34A is removed and inserted with regard to the storage chamber 2002 is configured from a portion of the chute 30A forming the left recessed groove 3012C and right recessed groove 3012D.

Furthermore, when the waste container 34A is inserted in the storage chamber 2002, a second positioning portion 42 (refer to FIG. 3) that contacts a portion of the waste container 34A and that positions the waste container 34A in a direction where the waste container 34A is inserted in the storage chamber 2002 is configured from the portion of the chute 30A forming the rear recessed groove 3012B.

Furthermore, the first maintaining portion 44 (refer to FIG. 3) that maintains from the vertical direction a condition where the upper portion of the waste container 34A and lower portion of the chute 30A are aligned at the storing position is configured from the rear recessed groove 3012B, left recessed groove 3012C, right recessed groove 3012C, and flanges 3422B, 3422C, and 3422D that engage with the recessed grooves 3012B, 3012C, and 3012D.

Furthermore, a second maintaining portion 46 (refer to FIG. 3) maintains from a direction orthogonal to the vertical direction a condition where the upper portion of the waste container 34A and lower portion of the chute 30A is maintained at the storing position is configured from the first positioning portion 40, second positioning portion 42, engaging and disengaging mechanism 2210, and pressing plate 36.

In other words, the maintaining portion 43 that maintains a waste container 34B is configured to include the first maintaining portion 44 and second maintaining portion 46.

According to the first embodiment, the chute 30A, waste flap 32, and waste container 34A are formed from a material having fire resistance performance and form the fire spreading prevention space 38 by the waste bin device main body 24 only, and therefore, a conventional plate material for partitioning the fire spreading prevention space 38 disposed on an outer side of the waste container 34A can be omitted, and thus the aircraft lavatory unit 10 which is advantageous from the perspective of reducing the number of components to achieve a reduction in weight is obtained.

Figure 7:
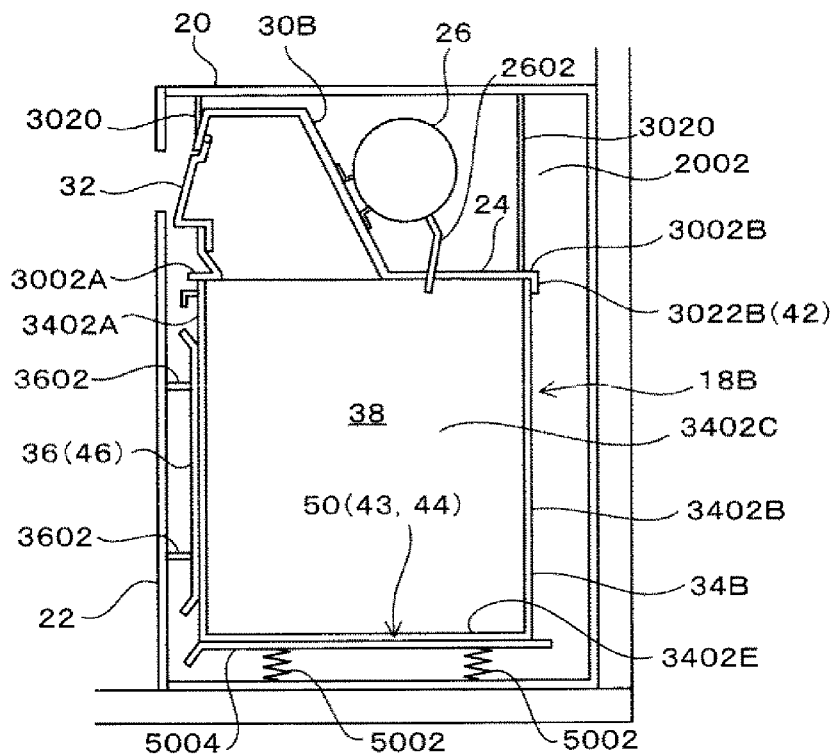
FIG. 7 is a cross-sectional side surface view of the waste bin device according to a second embodiment.
Figure 8:
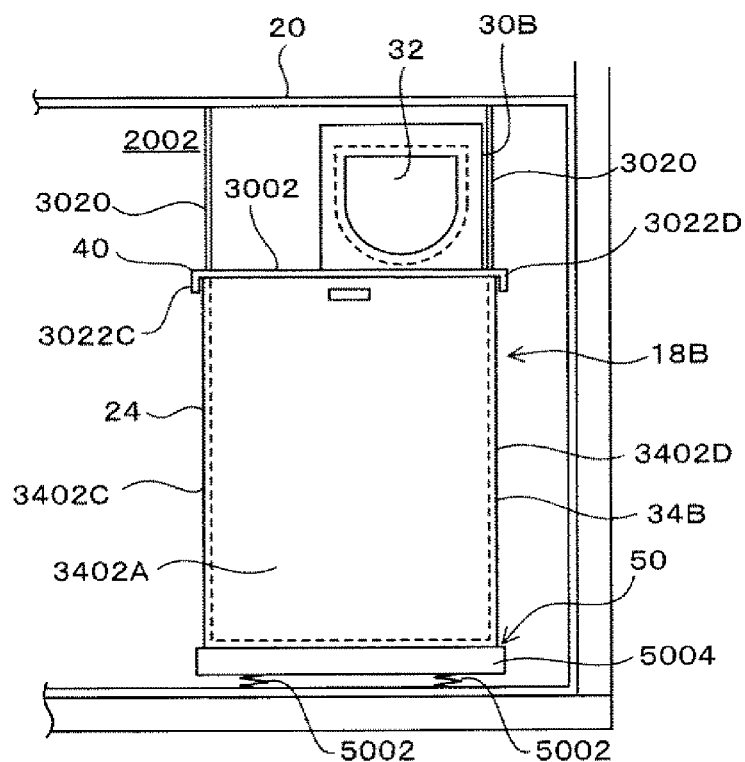
FIG. 8 is a front surface view of the waste bin device according to the second embodiment.

Next, a second embodiment will be described while referring to FIG. 7 and FIG. 8.

Note that when describing the following embodiments, the same reference symbols are attached to the same locations and members as the first embodiment, and descriptions thereof are omitted or simplified. Primarily, differing points will be described.

For a waste bin device 18B of the second embodiment, the rear flange 3422B, left flange 3422C, and right flange 3422D described in the first embodiment are not formed on a waste container 34B with a rectangular cross section, and the front surface 3402A, rear surface 3402B, left side surface 3402C, and right side surface 3402D of the waste container 34B are formed on a flat surface.

Furthermore, a chute 30B does not have the rear recessed groove 3012B, left recessed groove 3012C, and right recessed groove 3012D described in the first embodiment formed on the remaining three sides excluding the front side 3002A of the rectangular bottom plate portion 3002, and is bent downward from three sides along the remaining three sides excluding the front side 3002A, and a rear bent piece 3022B, left bent piece 3022C, and right bent piece 3022D that can contact the rear surface 3402B, left side surface 3402C, and right side surface 3402D of the waste container 34B are formed to extend at the storing position. Therefore, the bottom plate portion 3002 is configured to include the rear bent piece 3022B, left bent piece 3022C, and right bent piece 3022D.

Furthermore, in the second embodiment, the bottom surface 3402E of the waste container 34B is raised on a bottom portion (on a bottom portion of the base 20) of the storage chamber 2002, and bottom portion-side biasing members 50 that contact upper ends of the front surface 3402A, rear surface 3402B, left side surface 3402C, and right side surface 3402D of the waste container 34B are disposed on four sides of the rectangular bottom plate portion 3002 of the chute 30B.

The bottom portion-side biasing member 50 is configured from a plurality of springs 5002 disposed on a bottom plate of the base 20, and a biasing plate 5004 attached to a tip end of the plurality of springs 5002.

An inclined plate portion is provided on the biasing plate 5004 such that the waste container 34B can be easily inserted above the biasing plate 5004.

Next, removal and insertion of the waste container 34B into the storage chamber 2002 will be described.

First, a case where the waste container 34B is inserted into the storage chamber 2002 will be described.

The engaging and disengaging mechanism 2210 is released to open the opening and closing plate 22, the rear surface 3402B is faced toward the storage chamber 2002 and the bottom surface 3402E of the waste container 34B is positioned above the biasing plate 5004 while compressing the plurality of springs 5002, and the left side surface 3402C and right side surface 3402D are positioned on an inner side of the left bent piece 3022C and right bent piece 3022D to press the waste container 34B.

Eventually, an upper end of the rear surface 3402B of the waste container 34B contacts the rear bent piece 3022B.

When a hand is removed from the waste container 34B, an entire circumference of the up of the waste container 34B, in other words, the upper ends of the front surface 3402A, rear surface 3402B, left side surface 3402C, and right side surface 3402D contact the four sides of the bottom plate portion 3002 of the chute 30B by a biasing force of the bottom portion-side biasing member 50, and thus the waste container 34B reaches the storing position.

The fire spreading prevention space 38 that prevents fire from spreading to the outside of the waste bin device main body 24 due to a flame occurring when waste inserted in the waste bin device main body 24 catches fire is formed inside the waste bin device main body 24 at the storing position of the waste container 34B.

Next, the storage chamber 2002 is closed by the opening and closing plate 22.

When the storage chamber 2002 is closed by the opening and closing plate 22, the pressing plate 36 presses the front surface 3402A of the waste container 34B, and when a closed condition of the storage chamber 2002 by the opening and closing plate 22 is maintained by the engaging and disengaging mechanism 2210, a condition where the upper end of the rear surface 3402B of the waste container 34B contacts the rear bent piece 3022B is maintained by the pressing plate 36.

Removal of the waste container 34B from the storage chamber 2002 is performed by releasing the engaging and disengaging mechanism 2210 to open the opening and closing plate 22, and then pulling the waste container 34B frontward.

In the second embodiment, the first positioning portion 40 that can contact a portion in a direction orthogonal to a direction where the waste container 34B is removed and inserted with regard to the storage chamber 2002 and that positions the waste container 34B in the direction orthogonal to the direction where the waste container 34B is removed and inserted with regard to the storage chamber 2002 is configured from the left bent piece 3022C and right bent piece 3022D of the chute 30B.

Furthermore, when the waste container 34B is inserted in the storage chamber 2002, the second positioning portion 42 that contacts a portion of the waste container 34B and that positions the waste container 34B in a direction where the waste container 34B is inserted in the storage chamber 2002 is configured from the rear bent piece 3022B of the chute 30B.

Furthermore, at the storing position, the first maintaining portion 44 that maintains from the vertical direction a condition where the upper portion of the waste container 34B and lower portion of the chute 30B is configured from the bottom plate portion 3002 of the chute 30B, and bottom portion-side biasing member 50.

Furthermore, the second maintaining portion 46 maintains from a direction orthogonal to the vertical direction a condition where the upper portion of the waste container 34B and lower portion of the chute 30B is maintained at the storing position is configured from the first positioning portion 40, second positioning portion 42, engaging and disengaging mechanism 2210, and pressing plate 36.

In other words, the maintaining portion 43 that maintains a waste container 34B is configured to include the first maintaining portion 44 and second maintaining portion 46.

According to the second embodiment, the fire spreading prevention space 38 is formed by the waste bin device main body 24 only, similar to the first embodiment, and therefore, a conventional plate material for partitioning the fire spreading prevention space 38 disposed on an outer side of the waste container 34B can be omitted, and thus the aircraft lavatory unit 10 which is advantageous from the perspective of reducing the number of components to achieve a reduction in weight is obtained.

Figure 9:
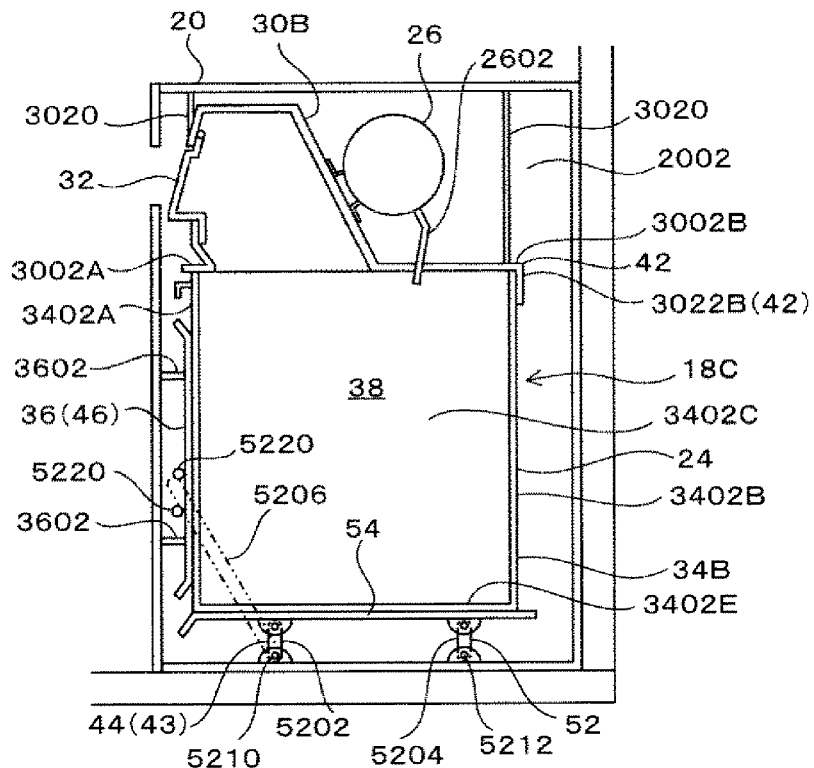
FIG. 9 is a cross-sectional side surface view of the waste bin device according to a third embodiment.
Figure 10:
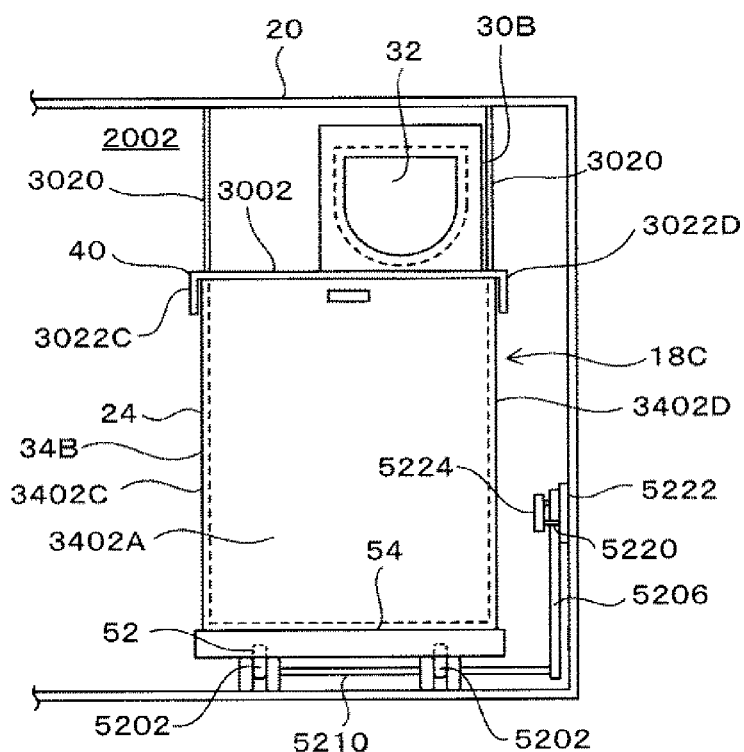
FIG. 10 is a front surface view of the waste bin device according to the third embodiment.

Next, a third embodiment will be described while referring FIG. 9 and FIG. 10.

A waste bin device 18C of the third embodiment is a modified example of the second embodiment. A point where a raising plate 54 that can rise by a linking mechanism 52 and raises the waste container 34B such that the upper portion of the waste container 34B contacts the lower portion of the chute 30B is disposed on a bottom portion (on a bottom plate of the base 20) of the storage chamber 2002 is used instead of the bottom portion-side biasing member 50 is different from the second embodiment, and other points are the same as the second embodiment.

The linking mechanism 52 is configured to include a pair of front links 5202, a pair of rear links 5204, and an operating rod 5206.

The pair of front links 5202 are provided on a front portion of the bottom plate of the base 20 such that base portions thereof can integrally pivot around a front supporting shaft 5210 as a fulcrum, and tip portions of the pair of front links 5202 pivot on the raising plate 54 via the supporting shaft.

The pair of rear links 5204 are provided on a rear portion of the bottom plate of the base 20 such that base portions thereof can integrally pivot around a rear supporting shaft 5212 as a fulcrum, and tip portions of the pair of rear links 5204 pivot on the raising plate 54 via the supporting shaft.

The operating rod 5206 is connected to the front supporting shaft 5210 and integrally pivots with the front links 5202. When the operating rod 5206 is raised from a fallen condition, the raising plate 54 is raised while maintaining a horizontal condition, and when the rod is lowered from the raised condition, the raising plate 54 is lowered while maintaining a horizontal condition, and thus is raised and lowered between a raising position and lowering position. In other words, a parallel moving mechanism is configured including the pair of front links 5202 and pair of rear links 5204.

Note that in the present embodiment, the dimensions between the lower surface of the bottom plate portion 3002 and lower ends of the rear bent piece 3022B, left bent piece 3022C, and right bent piece 3022D formed on the bottom plate portion 3002 of the chute 30B is set to be larger than a raising stroke of the raising plate 54 between the raising position and lowering position, which is advantageous from the perspective of simply and reliably positioning the waste container 34B at the storing position.

A boss portion 5222 is provided on a side wall of the base 20, two positioning pins 5220 that lock to the operating rods 5206 and maintain the raised condition of the operating rod 5206 is detachably provided with regard to the boss portion 5222, and the two positioning pins 5220 are connected to a connecting member 5224.

Next, removal and insertion of the waste container 34B into the storage chamber 2002 will be described.

First, a case where the waste container 34B is inserted into the storage chamber 2002 will be described.

The engaging and disengaging mechanism 2210 is released to open the opening and closing plate 22, and the operating rod 5206 is lowered to set the raising plate 54 to a lowering position.

Next, the rear surface 3402B is faced toward the storage chamber 2002, the waste container 34B is positioned above the raising plate 54, and the left side surface 3402C and right side surface 3402D are positioned on an inner side of the left bent piece 3022C and right bent piece 3022D, and thus the waste container 34B is pressed into the storage chamber 2002.

If the upper end of the rear surface 3402B of the waste container 34B contacts the rear bent piece 3022B, the operating rod 5206 is raised to raise the raising plate 54 to the raising position, and the two positioning pins 5220 are inserted in the boss portion 5222 to maintain the raising position of the raising plate 54.

The entire circumference of the upper end of the waste container 34B, in other words, the upper ends of the front surface 3402A, rear surface 3402B, left side surface 3402C, and right side surface 3402D contact four sides of the bottom plate portion 3002 of the chute 30B at the raising position of the raising plate 54, and an upper end of the rear surface 3402B contacts the rear bent piece 3022B, such that the waste container 34B is at the storing position.

The fire spreading prevention space 38 that prevents fire from spreading to the outside of the waste bin device main body 24 due to a flame occurring when waste inserted in the waste bin device main body 24 catches fire is formed inside the waste bin device main body 24 at the storing position of the waste container 34B.

Next, the storage chamber 2002 is closed by the opening and closing plate 22.

When the storage chamber 2002 is closed by the opening and closing plate 22, the pressing plate 36 presses the front surface 3402A of the waste container 34B, and when a closed condition of the storage chamber 2002 by the opening and closing plate 22 is maintained by the engaging and disengaging mechanism 2210, a condition where the upper end of the rear surface 3402B of the waste container 34B contacts the rear bent piece 3022B is maintained by the pressing plate 36.

Removal of the waste container 34B from the storage chamber 2002 is performed by releasing the engaging and disengaging mechanism 2210 to open the opening and closing plate 22, lowering the operating rod 5206 to set the raising plate 54 to the lowering position, and then pulling the waste container 34B frontward.

In the third embodiment, the first positioning portion 40 that can contact a portion in a direction orthogonal to a direction where the waste container 34B is removed and inserted with regard to the storage chamber 2002 and that positions the waste container 34B in the direction orthogonal to the direction where the waste container 34B is removed and inserted with regard to the storage chamber 2002 is configured from the left bent piece 3022C and right bent piece 3022D of the chute 30B.

Furthermore, when the waste container 34B is inserted in the storage chamber 2002, the second positioning portion 42 that contacts a portion of the waste container 34B and that positions the waste container 34B in a direction where the waste container 34B is inserted in the storage chamber 2002 is configured from the rear bent piece 3022B of the chute 30B.

Furthermore, at the storing position, the first maintaining portion 44 that maintains from the vertical direction a condition where the upper portion of the waste container 34B and lower portion of the chute 30B is configured from the bottom plate portion 3002 of the chute 30B, linking mechanism 52, and raising plate 54.

Furthermore, the second maintaining portion 46 maintains from a direction orthogonal to the vertical direction a condition where the upper portion of the waste container 34B and lower portion of the chute 30B is maintained at the storing position is configured from the first positioning portion 40, second positioning portion 42, engaging and disengaging mechanism 2210, and pressing plate 36.

In other words, the maintaining portion 43 that maintains a waste container 34B is configured to include the first maintaining portion 44 and second maintaining portion 46.

According to the third embodiment, the aircraft lavatory unit 10 which is advantageous from the perspective of reducing the number of components to achieve a reduction in weight is achieved, similar to the first embodiment.

Figure 11:
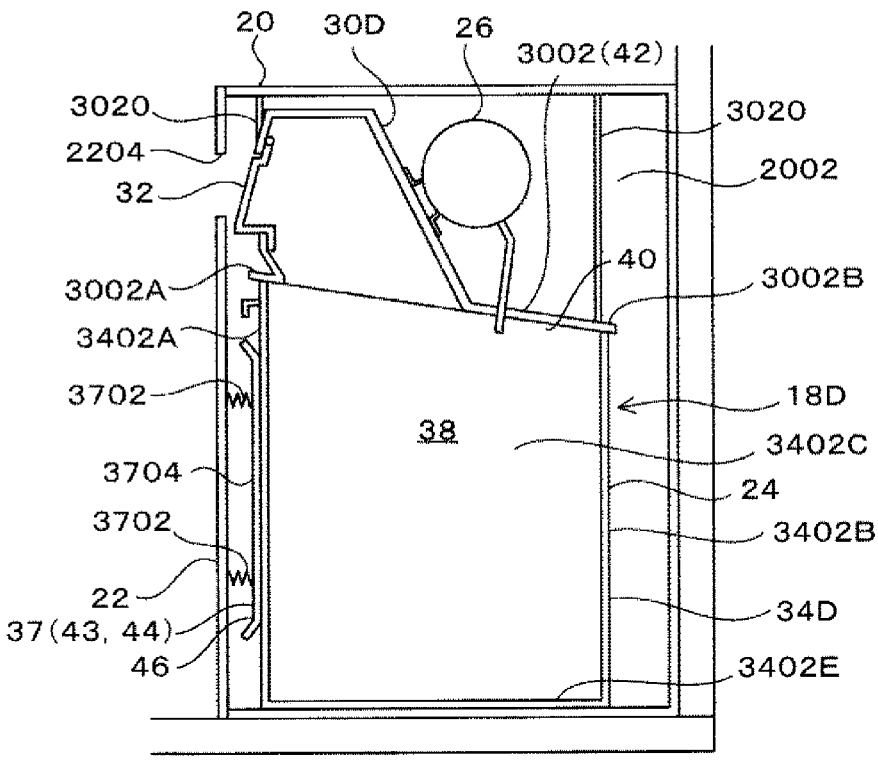
FIG. 11 is a cross-sectional side surface view of the waste bin device according to a fourth embodiment.

Next, a fourth embodiment will be described while referring FIG. 11.

A waste bin device 18D of the fourth embodiment is a modified example of the second embodiment, and the rectangular bottom plate portion 3002 of a chute 30D is inclined so as to be gradually displaced downward as the portion separates from the opening and closing plate 22.

Only the left bent piece 3022C and right bent piece 3022D are formed on the bottom plate portion 3002, and the rear bent piece 3022B is not formed.

An upper end of a waste container 34D is inclined so as to contact the bottom plate portion 3002 at the storing position.

Furthermore, an opening and closing plate-side biasing member 37 that biases the waste container 34D in a direction separated from the opening and closing plate 22 is provided on the back surface of the opening and closing plate 22 positioned on the storage chamber 2002 side in a condition where the storage chamber 2002 is closed by the opening and closing plate 22.

The opening and closing plate-side biasing member 37 is configured from a plurality of springs 3702 attached to the back surface of the opening and closing plate 22, and a pressing plate 3704 attached to a tip end of the plurality of springs 3702.

Furthermore, in the fourth embodiment, the bottom portion-side biasing member 50 is not disposed on a bottom portion of the storage chamber 2002, and the waste container 34D is placed on the bottom plate of the base 20.

Next, removal and insertion of the waste container 34D into the storage chamber 2002 will be described.

First, a case where the waste container 34D is inserted into the storage chamber 2002 will be described.

The engaging and disengaging mechanism 2210 is released to open the opening and closing plate 22, the rear surface 3402B is faced toward the storage chamber 2002, and the left side surface 3402C and right side surface 3402D are positioned on an inner side of the left bent piece 3022C and right bent piece 3022D to press the waste container 34D into the storage chamber 2002 on the bottom plate of the base 20.

Eventually, an entire circumference of the upper end of the waste container 34D contacts the bottom plate portion 3002 of the chute 30D, and thus the waste container 34D reaches the storing position.

At the storing position of the waste container 34D, the entire circumference of the up of the waste container 34D, in other words, the upper ends of the front surface 3402A, rear surface 3402B, left side surface 3402C, and right side surface 3402D contact the four sides of the bottom plate portion 3002 of the chute 30D.

The fire spreading prevention space 38 that prevents fire from spreading to the outside of the waste bin device main body 24 due to a flame occurring when waste inserted in the waste bin device main body 24 catches fire is formed inside the waste bin device main body 24 at the storing position of the waste container 34D.

Next, the storage chamber 2002 is closed by the opening and closing plate 22.

When the storage chamber 2002 is closed by the opening and closing plate 22, the pressing plate 3704 presses the front surface 3402A of the waste container 34D by an elastic force of the plurality of springs 3702, and when the closed condition of the opening and closing plate 22 is maintained by the engaging and disengaging mechanism 2210, a condition is maintained where the upper end of the waste container 34D contacts the bottom plate portion 3002 of the chute 30D by the pressing plate 3704 and elastic force of the plurality of springs 3702.

Removal of the waste container 34D from the storage chamber 2002 is performed by releasing the engaging and disengaging mechanism 2210 to open the opening and closing plate 22, and then pulling the waste container 34D frontward.

In the fourth embodiment, the first positioning portion 40 that can contact a portion in a direction orthogonal to a direction where the waste container 34D is removed and inserted with regard to the storage chamber 2002 and that positions the waste container 34D in the direction orthogonal to the direction where the waste container 34D is removed and inserted with regard to the storage chamber 2002 is configured from the left bent piece 3022C and right bent piece 3022D of the chute 30D.

Furthermore, when the waste container 34D is inserted in the storage chamber 2002, the second positioning portion 42 that contacts a portion of the waste container 34D and that positions the waste container 34D in a direction where the waste container 34D is inserted in the storage chamber 2002 is configured from the bottom plate portion 3002 of the chute 30D.

Furthermore, at the storing position, an elastic force of the plurality of springs 3702 acts on the bottom plate portion 3002 of the chute 30D from the upper end of the waste container 34D via the pressing plate 3704, and the waste container 34D is pressed downward by the bottom plate portion 3002 of the chute 30D, and therefore, the first maintaining portion 44 that maintains from the vertical direction a condition where the upper portion of the waste container 34D and lower portion of the chute 30D is configured from the bottom plate portion 3002 of the chute 30D, the bottom plate of the base 20, the plurality of springs 3702, pressing plate 3704, and engaging and disengaging mechanism 2210.

Furthermore, the second maintaining portion 46 maintains from a direction orthogonal to the vertical direction a condition where the upper portion of the waste container 34D and lower portion of the chute 30D is maintained at the storing position is configured from the first positioning portion 40, second positioning portion 42, plurality of springs 3702, pressing plate 3704, engaging and disengaging mechanism 2210, and bottom plate portion 3002 of the chute 30D.

In other words, the maintaining portion 43 that maintains a waste container 34B is configured to include the first maintaining portion 44 and second maintaining portion 46.

According to the fourth embodiment, the aircraft lavatory unit 10 which is advantageous from the perspective of reducing the number of components to achieve a reduction in weight is achieved, similar to the first embodiment.

Note that in the fourth embodiment, the bottom portion-side biasing member 50 or the linking mechanism 52 and raising plate 54 may be provided on a bottom portion of the storage chamber 2002, similar to the second and third embodiments.

Figure 12:
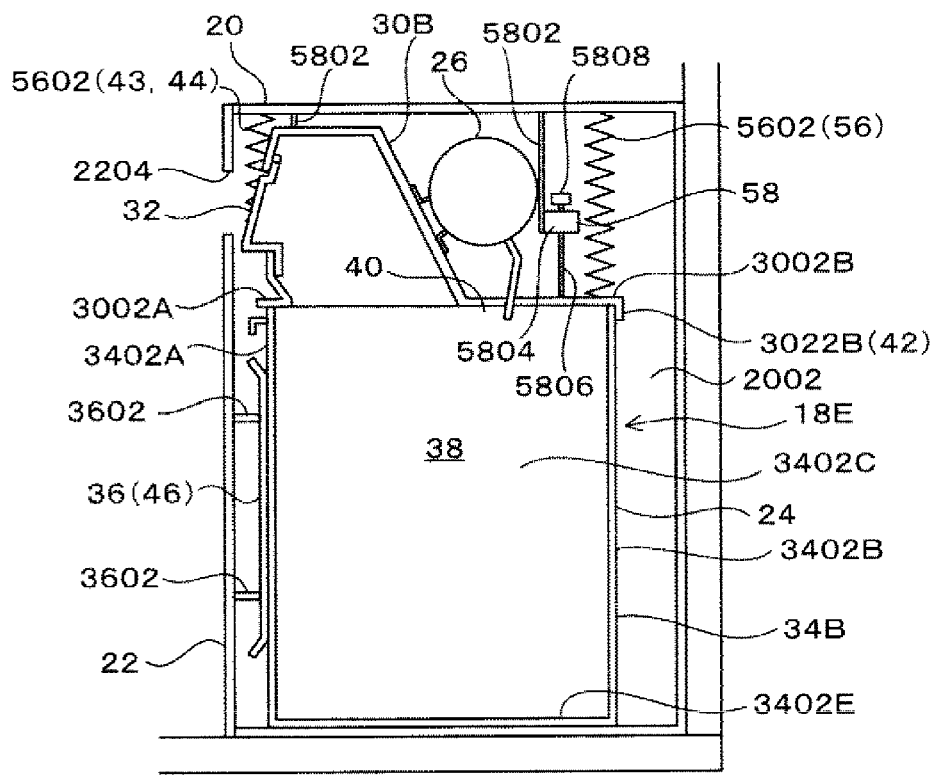
FIG. 12 is a cross-sectional side surface view of the waste bin device according to a fifth embodiment.
Figure 13:
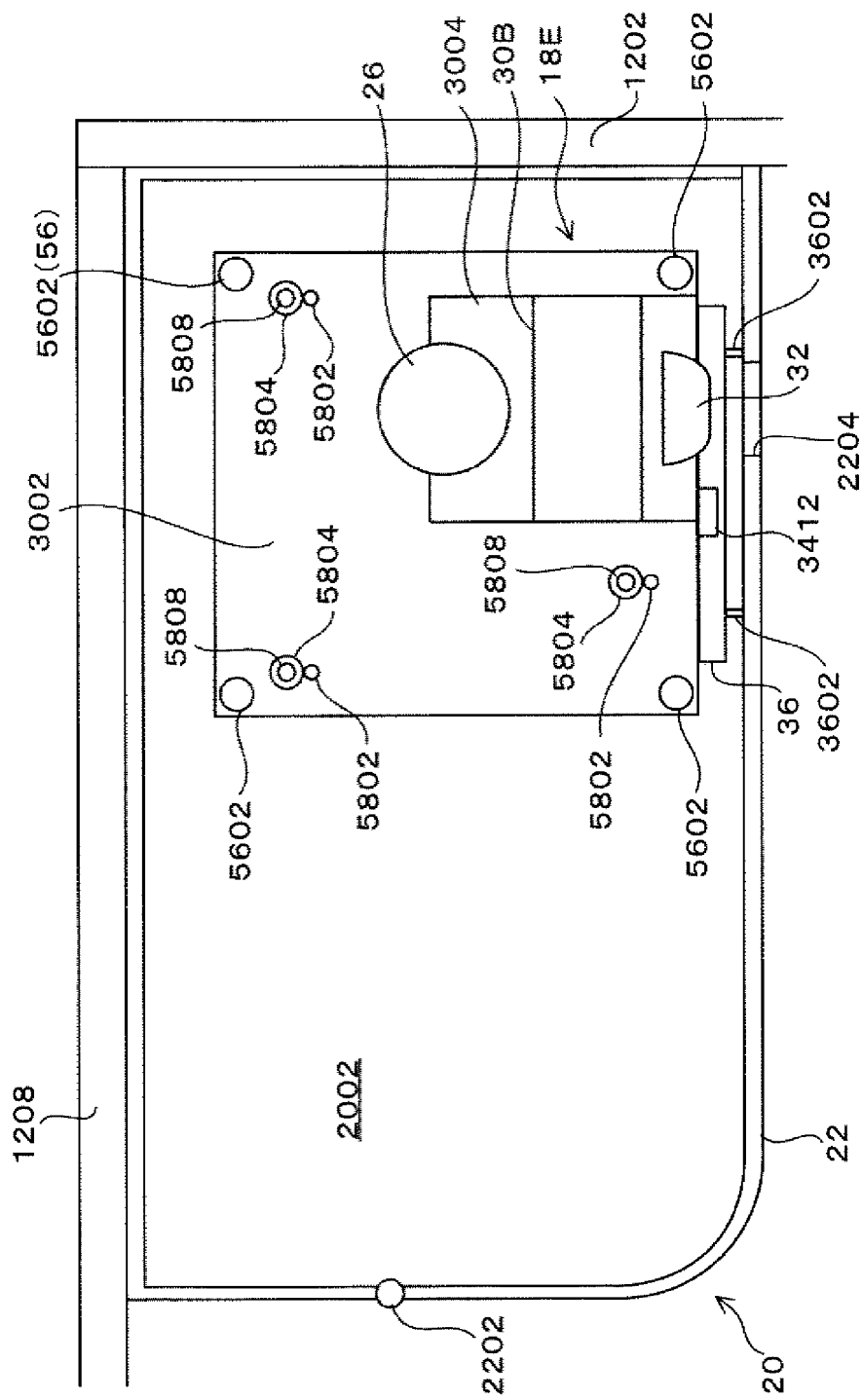
FIG. 13 is a plan view of the waste bin device according to the fifth embodiment.

Next, a fifth embodiment will be described while referring FIG. 12 and FIG. 13.

A waste bin device 18E of the fifth embodiment is a modified example of the second embodiment. A point where a chute-side biasing member 56 that biases the chute 30B downward such that a lower portion of the chute 30B contacts an upper portion of the waste container 34B is provided on the storage chamber 2002 instead of the bottom portion-side biasing member 50 biasing the waste container 34B in the raising direction is different from the second embodiment, and other points are the same as the second embodiment.

The chute-side biasing member 56 is configured from a coil spring 5602, and is provided between four corners of the bottom plate portion 3002 of the chute 30B and the upper plate of the storage chamber 2002.

Furthermore, at least three stoppers 58 that determine a lower limit position of the chute 30B are provided. The stopper 58 has a ring 5804 attached to a lower end of a rod 5802 orthogonally provided from the upper plate of the storage chamber 2002, a rod 5806 erected from the bottom plate portion 3002 of the chute 30B and inserted in the ring 5804, and a large diameter portion 5808 having an outer diameter with a larger dimension than a hole diameter of the ring 5804 attached to the upper end of the rod 5806, and the stopper 58 also has a function as a guide for guiding the chute 30B in a rise-able manner.

The large diameter portion 5808 contacts an upper surface of the ring 5804 to determine the lower limit position of the chute 30B.

At the lower limit position of the chute 30B, the bottom plate portion 3002 is positioned at a height that is lower than a height of the waste container 34B placed on the bottom plate of the base 20.

Furthermore, in the fifth embodiment, a pressing plate 36 that presses the front surface 3402A of the waste container 34B and presses an upper end of the rear surface 3402B of the waste container 34B onto the rear bent piece 3022B is provided on a back surface of the opening and closing plate 22 positioned on a storage chamber 2002 side in a condition where the storage chamber 2002 is closed by the opening and closing plate 22, similar to the first to third embodiments.

The pressing plate 36 supports tip portions of a plurality of rods 3602 attached to the back surface of the opening and closing plate 22.

Next, removal and insertion of the waste container 34B into the storage chamber 2002 will be described.

First, a case where the waste container 34B is inserted into the storage chamber 2002 will be described.

The opening and closing plate 22 is opened, the chute 30B is raised, and the rear surface 3402B is faced toward the storage chamber 2002 such that the waste container 34B is positioned on the bottom plate of the base 20 forming the bottom portion of the storage chamber 2002, and the left side surface 3402C and right side surface 3402D are positioned on an inner side of the left bent piece 3022C and right bent piece 3022D, and thus the waste container 34B is pressed into the storage chamber 2002.

Eventually, an upper end of the rear surface 3402B of the waste container 34B contacts the rear bent piece 3022B, and the waste container 34D reaches the storing position.

At the storing position of the waste container 34B, the entire circumference of the up of the waste container 34B, in other words, the upper ends of the front surface 3402A, rear surface 3402B, left side surface 3402C, and right side surface 3402D contact the four sides of the bottom plate portion 3002 of the chute 30B.

The fire spreading prevention space 38 that prevents fire from spreading to the outside of the waste bin device main body 24 due to a flame occurring when waste inserted in the waste bin device main body 24 catches fire is formed inside the waste bin device main body 24 at the storing position of the waste container 34B.

Next, the storage chamber 2002 is closed by the opening and closing plate 22.

When the storage chamber 2002 is closed by the opening and closing plate 22, the pressing plate 36 presses the front surface 3402A of the waste container 34B, and when a closed condition of the storage chamber 2002 by the opening and closing plate 22 is maintained by the engaging and disengaging mechanism 2210, a condition where the upper end of the rear surface 3402B of the waste container 34B contacts the rear bent piece 3022B is maintained by the pressing plate 36.

Removal of the waste container 34B from the storage chamber 2002 is performed by releasing the engaging and disengaging mechanism 2210 to open the opening and closing plate 22, and then pulling the waste container 34B frontward.

In the fifth embodiment, the first positioning portion 40 that can contact a portion in a direction orthogonal to a direction where the waste container 34B is removed and inserted with regard to the storage chamber 2002 and that positions the waste container 34B in the direction orthogonal to the direction where the waste container 34B is removed and inserted with regard to the storage chamber 2002 is configured from the left bent piece 3022C and right bent piece 3022D of the chute 30B.

Furthermore, when the waste container 34B is inserted in the storage chamber 2002, the second positioning portion 42 that contacts a portion of the waste container 34B and that positions the waste container 34B in a direction where the waste container 34B is inserted in the storage chamber 2002 is configured from the rear bent piece 3022B of the chute 30B.

Furthermore, in the vertical direction of the storing position, the first maintaining portion 44 that maintains a condition where the upper portion of the waste container 34B and lower portion of the chute 30B is configured from the chute-side biasing member 56 and bottom portion of the storage chamber 2002.

Furthermore, in the direction orthogonal to the vertical direction of the storing position, the second maintaining portion 46 maintains a condition where the upper portion of the waste container 34B and lower portion of the chute 30B is maintained is configured from the first positioning portion 40, second positioning portion 42, engaging and disengaging mechanism 2210, and pressing plate 36.

In other words, the maintaining portion 43 that maintains a waste container 34B is configured to include the first maintaining portion 44 and second maintaining portion 46.

According to the fifth embodiment, the aircraft lavatory unit 10 which is advantageous from the perspective of reducing the number of components to achieve a reduction in weight is achieved, similar to the first embodiment.

Note that in the first to third embodiments, it is arbitrary that the rods 3602 that support the pressing plate 36 is replaced by the springs 3702 used in the present embodiment or the like.

Furthermore, the chute-side biasing member 56 of the present embodiment can also be applied to the second, third, and fourth embodiments.

Next, a sixth embodiment will be described while referring FIG. 14 to FIG. 17.

Figure 15:
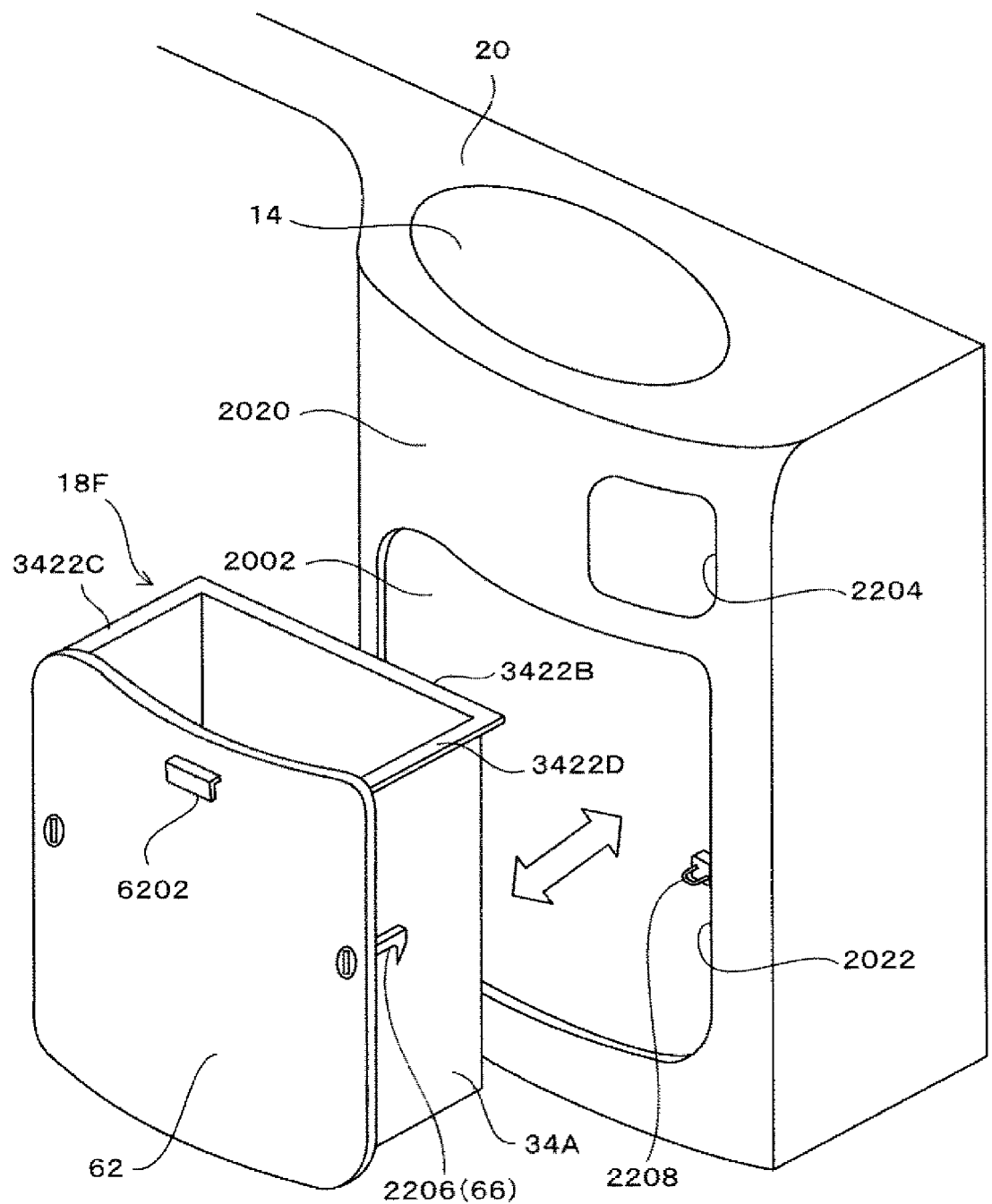
FIG. 15 is a perspective view of the waste bin device according to the sixth embodiment in a condition where a waste container is removed.

In the sixth embodiment, the base 20 does not have the opening and closing plate 22, and a waste bin device 18F has a removing and inserting opening 2022 where the waste container 34A is removed and inserted into the storage chamber 2002 below the waste inserting port 2204 is provided on a wall portion 2020 of the base 20, which partitions the storage chamber 2002 and where the waste inserting port 2204 is formed, as illustrated in FIG. 15.

The waste container 34A is configured to include a front plate portion 62 that closes the removing and inserting opening 2022, and a connecting portion 64 that connects the front plate portion 62 and waste container 34A, in a condition inserted in the storage chamber 2002 from the removing and inserting opening 2022 and positioned in the storing position.

The front plate portion 62 is formed with a larger contour than the removing and inserting opening 2022, and a handle 6202 is provided on the front plate portion 62.

Figure 17:
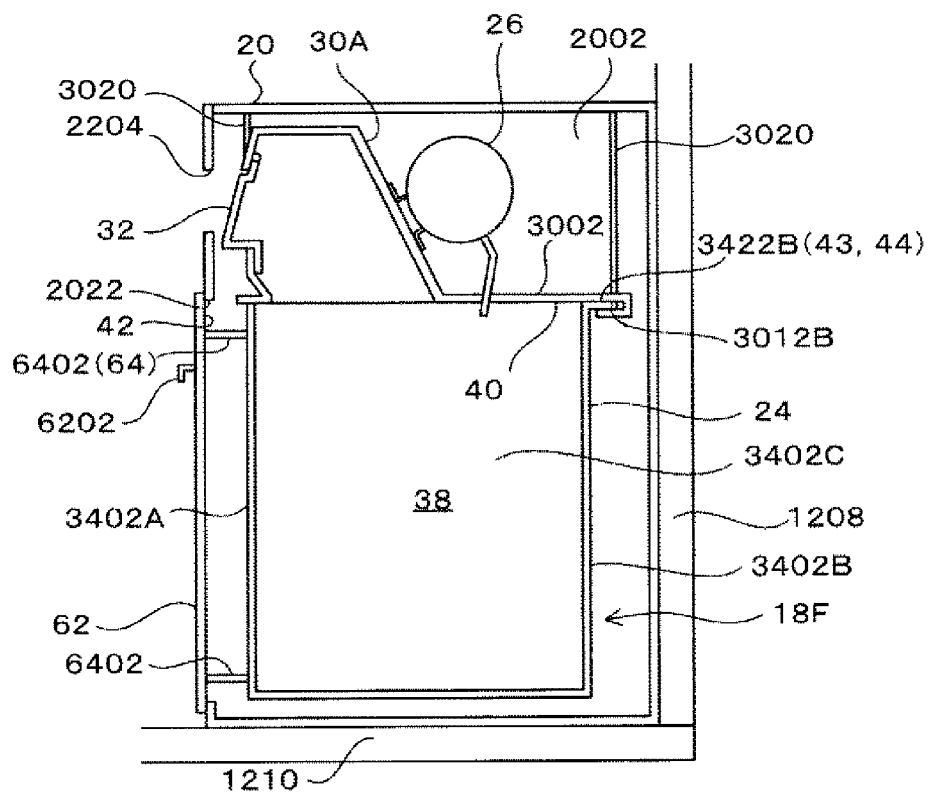
FIG. 17 is a cross-sectional side surface view of the waste bin device according to the sixth embodiment.

The connecting portion 64 is configured from a plurality of rods 6402, brings an outer circumferential portion of the front plate portion 62 into contact with the wall portion 2020 on periphery of the removing and inserting opening 2022, and as illustrated in FIG. 17, is formed at a dimension where the waste container 34A is positioned in the storing position, in a condition where the removing and inserting opening 2022 is closed by the front plate portion 62. Therefore, in the sixth embodiment, the front plate portion 62 corresponds to the opening and closing plate 22 of the first to fifth embodiments that opens and closes the storage chamber 2002.

The chute 30A and waste container 34A are the same as the first embodiment. The bottom plate portion 3002 of the chute 30A has the front side 3002A, rear side 3002B, left side 3002C, and right side 3002D, and has the rear recessed groove 3012B, left recessed groove 3012C (refer to FIG. 4), and right recessed groove 3012D (refer to FIG. 4), and the front side 3002A is near the removing and inserting opening 2022.

The waste container 34A has the front surface 3402A, rear surface 3402B, left side surface 3402C, and right side surface 3402D, and has the rear flange 3422B, left flange 3422C, and right flange 3422D that detachably engage to the recessed grooves 3012B, 3012C, and 3012D, and the front surface 3402A connects to the front plate portion 62 via the connecting portion 64.

Figure 14:
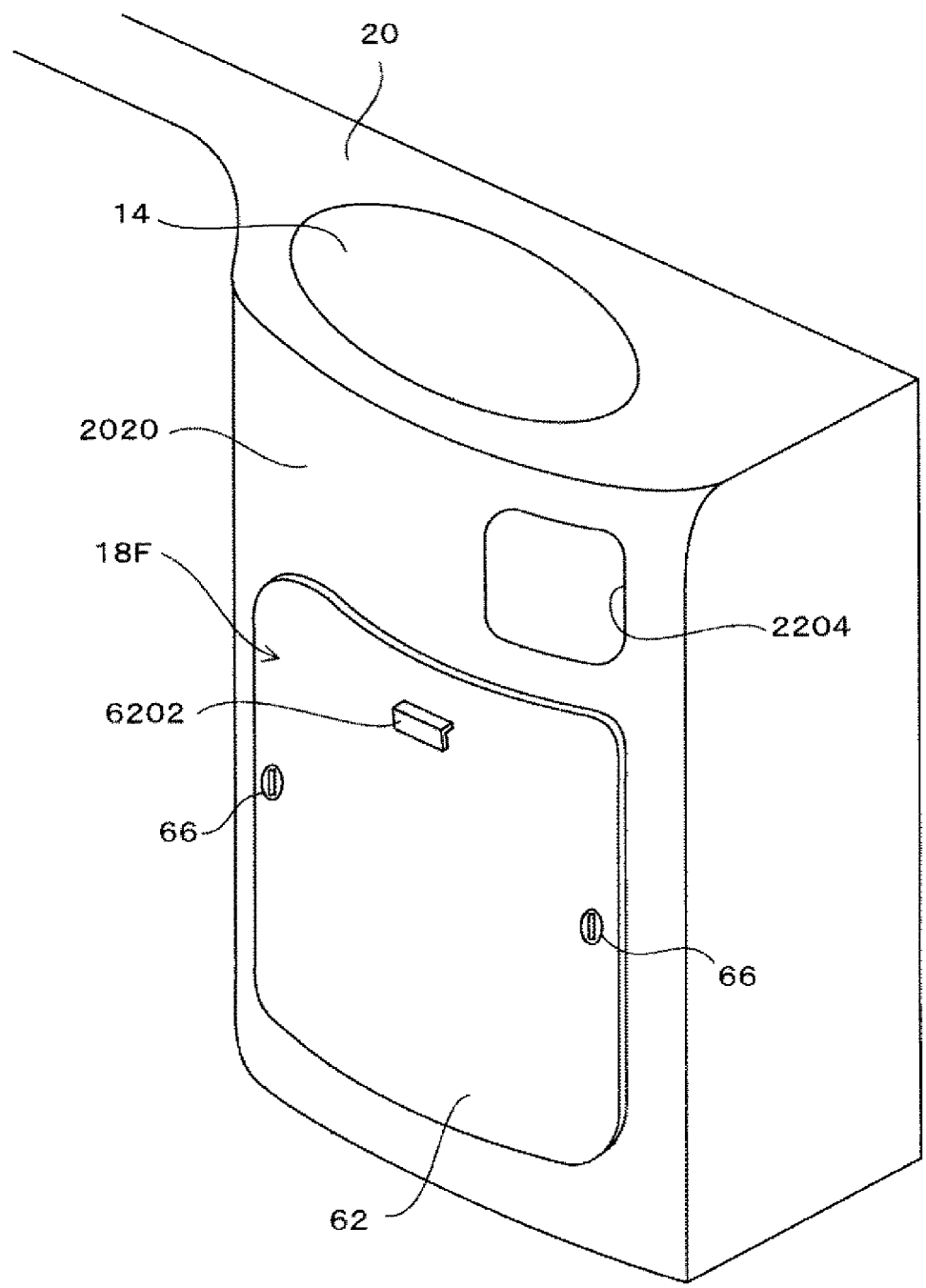
FIG. 14 is a perspective view of the waste bin device according to the sixth embodiment.
Figure 16:
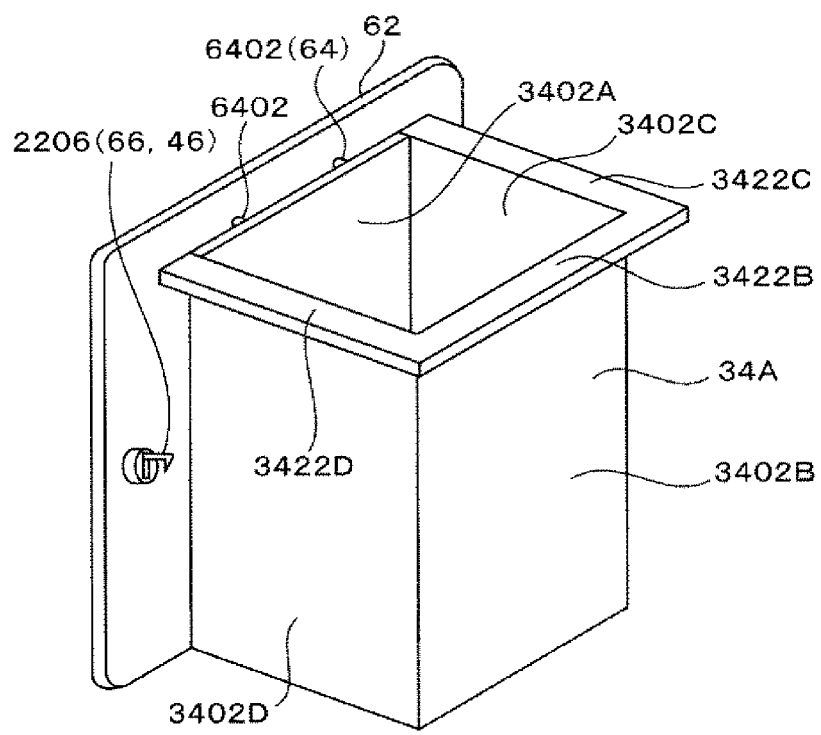
FIG. 16 is a perspective view of the waste container according to the sixth embodiment.

Furthermore, as illustrated in FIG. 14 to FIG. 16, the engaging and disengaging mechanism 66 where the latch 2206 on a front plate portion 62 side engages with the striker 2208 on a base 20 side is provided on both sides of the front plate portion 62 in a condition where the storage chamber 2002 is closed by the front plate portion 62, and thus the front plate portion 62 is not a structure that can be easily opened in order to prevent mischief and terrorism.

Removal and insertion of the waste container 34A into the storage chamber 2002 will be described.

First, a case where the waste container 34A is inserted into the storage chamber 2002 will be described.

The rear surface 3402B is faced toward the storage chamber 2002, the waste container 34A is pressed into the storage chamber 2002 from the removing and inserting opening 2022 while inserting the left flange 3422C and right flange 3422D into the left recessed groove 3012C and right recessed groove 3012D, and the rear flange 3422B is inserted into the rear recessed groove 3012B.

Eventually, the outer circumferential portion of the front plate portion 62 contacts the wall portion 2020, and the waste container 34A reaches the storing position in a condition where the storage chamber 2002 is closed by the front plate portion 62.

At the storing position of the waste container 34A, an upper end of the front surface 3402A of the waste container 34A contacts or nearly contacts a lower surface of the front side 3002A of the bottom plate portion 3002 of the chute 30A, similar to the first embodiment.

The fire spreading prevention space 38 that prevents fire from spreading to the outside of the waste bin device main body 24 due to a flame occurring when waste inserted in the waste bin device main body 24 catches fire is formed inside the waste bin device main body 24 at the storing position of the waste container 34A.

Furthermore, when the closed condition of the storage chamber 2002 by the front plate portion 62 is maintained by the engaging and disengaging mechanism 66, a condition is maintained where a portion of the chute 30A forming the rear recessed groove 3012B and the upper end of the rear surface 3402B of the waste container 34A contact.

Removal of the waste container 34A from the storage chamber 2002 is performed by releasing the engaging and disengaging mechanism 66, pulling the front plate portion 62 using the handle 6202, and then pulling the waste container 34A frontward.

In the sixth embodiment, the first positioning portion 40 (refer to FIG. 4) that can contact a portion in a direction orthogonal to a direction where the waste container 34A is removed and inserted with regard to the storage chamber 2002 and that positions the waste container 34A in the direction orthogonal to the direction where the waste container 34A is removed and inserted with regard to the storage chamber 2002 is configured from a portion of the chute 30A forming the left recessed groove 3012C and right recessed groove 3012D.

Furthermore, when the waste container 34A is inserted in the storage chamber 2002, the second positioning portion 42 that contacts a portion of the waste container 34A and that positions the waste container 34A in a direction where the waste container 34A is inserted in the storage chamber 2002 is configured from a portion of the wall portion 2020 on a periphery of the removing and inserting opening 2022 contacted by the outer circumferential portion of the front plate portion 62.

Furthermore, the first maintaining portion 44 that maintains from the vertical direction a condition where the upper portion of the waste container 34A and lower portion of the chute 30A are aligned at the storing position is configured from the rear recessed groove 3012B, left recessed groove 3012C, right recessed groove 3012C, and flanges 3422B, 3422C, and 3422D that engage with the recessed grooves 3012B, 3012C, and 3012D.

Furthermore, the second maintaining portion 46 maintains from a direction orthogonal to the vertical direction a condition where the upper portion of the waste container 34A and lower portion of the chute 30A is maintained at the storing position is configured from the first positioning portion 40, second positioning portion 42, and engaging and disengaging mechanism 66.

In other words, the maintaining portion 43 that maintains a waste container 34B is configured to include the first maintaining portion 44 and second maintaining portion 46.

According to the sixth embodiment, the aircraft lavatory unit 10 which is advantageous from the perspective of reducing the number of components to achieve a reduction in weight is achieved, similar to the first embodiment.

The sixth embodiment can also be applied on the second embodiment providing the rear bent piece 3022B, left bent piece 3022C, right bent piece 3022D, and bottom portion-side biasing member 50, and the fifth embodiment providing the chute-side biasing member 56 that biases the chute 30A downward. In this case, the front surface 3402A of the waste container 34 is preferably connected to the front plate portion 62 via the connecting portion 64, and the second positioning portion 42 is configured from a portion of the wall portion 2020 on a periphery of the removing and inserting opening 2022 contacted by the outer circumferential portion of the front plate portion 62, and thus the rear bent piece 3022B will not be necessary.

Note that in the first to fourth embodiments and sixth embodiment, the upper and lower positioning portions that perform positioning of the waste container 34A in the vertical direction of the storing position are configured to include the bottom plate portion 3002 of the chute 30A, due to the chute 30A being maintained in an immovable manner in the vertical direction inside the storage chamber 2002, and in the fifth embodiment, the portions are configured to include the upper surface of the bottom portion (bottom plate of the base 20) of the storage chamber 2002, due to the chute 30A maintained in an immovable manner in the vertical direction inside the storage chamber 2002, and biased downward.

The invention claimed is:

1. A waste bin device of an aircraft lavatory unit, comprising a waste bin device main body including:
    a chute stored in a storage chamber of the aircraft lavatory unit, where a waste inserting opening is formed at a location corresponding to a waste inserting port of a wall portion partitioning the storage chamber;
    a waste flap that enables opening and closing of the waste inserting opening, and is biased in a direction of closing the waste inserting opening; and
    a waste container disposed at a location where waste inserted from the waste inserting port is stored below the chute; wherein
    the chute, waste flap, and waste container are formed having fire resistance performance,
    the chute is maintained inside the storage chamber,
    a fire spreading prevention space that prevents fire from spreading to the outside of the waste bin device main body due to a flame occurring when waste inserted in the waste container catches fire is formed inside the waste bin device main body at a storing position of the waste container where an upper portion of the waste container is positioned with regard to a lower portion of the chute, and
    a maintaining portion that maintains the waste container at the storing position is provided.

2. The waste bin device of an aircraft lavatory unit according to claim 1, wherein the maintaining portion is configured to include a first maintaining portion that maintains from a vertical direction a condition where the upper portion of the waste container and lower portion of the chute are aligned, and a second maintaining portion that maintains the condition from a direction orthogonal to the vertical direction, at the storing position of the waste container.

3. The waste bin device of an aircraft lavatory unit according to claim 2, wherein the second maintaining portion is configured to include:
    a first positioning portion that positions the waste container in a direction orthogonal to a direction where the waste container is removed and inserted with regard to the storage chamber, in a manner that can contact a portion in a direction orthogonal to the direction where the waste container is removed and inserted with regard to the storage chamber; and
    a second positioning portion that contacts a portion of the waste container and positions the waste container in a direction where the waste container is inserted in the storage chamber, when the waste container is inserted in the storage unit.

4. The waste bin device of an aircraft lavatory unit according to claim 3, wherein
    a portion of the wall portion partitioning the storage chamber is formed by an opening and closing plate that opens and closes the storage chamber,
    an engaging and disengaging mechanism that detachably joins the opening and closing plate and the wall portion, in a condition where the storage chamber is closed by the opening and closing plate,
    a pressing plate that presses the waste container in the direction where the storage chamber is inserted so as to bring the waste container into contact with the second positioning portion is provided on a back surface of the opening and closing plate positioned on the storage chamber side in a condition where the storage chamber is closed by the opening and closing plate, and
    the second maintaining portion is configured to include the engaging and disengaging mechanism and pressing plate.

5. The waste bin device of an aircraft lavatory unit according to claim 3, wherein
    a removing and inserting opening for performing removal and insertion of the waste container into the storage chamber is provided below the waste inserting port, on a wall portion that partitions the storage chamber and where the waste inserting port is formed,
    the waste container is configured to include a front plate portion that contacts a portion of the wall portion on a periphery of the removing and inserting opening and closes the removing and inserting opening, and a connecting portion that connects the front plate portion and waste container, in a condition inserted in the storage chamber from the removing and inserting opening and positioned at the storing position,
    a engaging and disengaging mechanism that detachably joins the front plate and wall portion is provided in a condition where the removing and inserting opening is closed by the front plate portion,
    the second maintaining portion is configured to include the engaging and disengaging mechanism, and
    the second positioning portion is configured to include a portion of the wall portion on a periphery of the removing and closing opening.

6. The waste bin device of an aircraft lavatory unit according to claim 4, wherein
    the chute has a rectangular bottom plate portion,
    the bottom plate portion has a front side disposed at a location near the opening and closing plate, a rear side opposite from the front side, and a left side and right side that connect the front side and rear side,
    a rear recessed groove, left recessed groove, and right recessed groove respectively formed extending along three remaining sides, excluding the front side of the bottom plate portion,
    the waste container has a cross section that is rectangular, and has a front surface disposed at a location near the opening and closing plate, a rear surface opposite from the front surface, and a left side surface and right side surface that connect the front surface and rear surface, a flange that detachably engages with the rear recessed groove, left recessed groove, and right recessed groove is formed along an upper edge of the remaining three side surface, excluding the front surface, the first positioning portion is configured to include a portion of the chute forming the left recessed groove and right recessed groove, the second positioning portion is configured to include a portion of the chute forming the rear recessed groove, and the first maintaining portion is configured to include the rear recessed groove, left recessed groove, right recessed groove, and flange that engages with the recessed grooves.

7. The waste bin device of an aircraft lavatory unit according to claim 4, wherein the waste container has a cross section that is rectangular, and has a front surface disposed at a location near the opening and closing plate, a rear surface opposite from the front surface, and a left side surface and right side surface that connect the front surface and rear surface, the chute has a rectangular bottom plate portion, the bottom plate portion has a front side disposed at a location near the opening and closing plate, a rear side opposite from the front side, and a left side and right side that connects the front side and rear side, a left bent piece and right bent piece respectively bent downward from the sides on the left side and right side so as to be able to contact the left side surface and right side surface of the waste container are formed to extend at the storing position, the bottom plate portion is inclined so as to be gradually displaced downward as the portion separates from the wall portion partitioning the storage chamber, an upper end of the waste container is inclined so as to contact the bottom plate portion, the first positioning portion is configured to include the left bent piece and right bent piece, and the second positioning portion is configured to include the bottom plate portion.

8. The waste bin device of an aircraft lavatory unit according to claim 4, wherein a bottom portion-side biasing member raises a bottom portion of the waste container such that the upper portion of the waste container contacts the lower portion of the chute is disposed on the bottom portion of the storage chamber, and the first maintaining portion is configured to include the bottom portion-side biasing member.

9. The waste bin device of an aircraft lavatory unit according to claim 4, wherein a raising portion that can rise by a linking mechanism and raises the waste container such that the upper portion of the waste container contacts the lower portion of the chute is disposed on the bottom portion of the storage chamber, and the first maintaining portion is configured to include the raising portion.

10. The waste bin device of an aircraft lavatory unit according to claim 4, wherein a chute-side biasing member that biases the chute downward such that the lower portion of the chute contacts the upper portion of the waste container is disposed on the storage chamber, and the first maintaining portion is configured to include the chute-side biasing member.

11. The waste bin device of an aircraft lavatory unit according to claim 8, wherein the waste container has a cross section that is rectangular, and has a front surface disposed at a location near the opening and closing plate, a rear surface opposite from the front surface, and a left side surface and right side surface that connect the front surface and rear surface, the chute has a rectangular bottom plate portion, the bottom plate portion has a front side disposed at a location near the opening and closing plate, a rear side opposite from the front side, and a left side and right side that connects the front side and rear side, a left bent piece and right bent piece respectively bent on the left side and right side downward from the sides so as to be able to contact the left side surface and right side surface of the waste container is formed to extend at the storing position, a rear bent piece, left bent piece, and right bent piece respectively bent downward from the remaining three sides of the bottom plate portion excluding the front side to as to be able to contact the rear surface, left side surface, and right side surface of the waste container are disposed at the storing position, the first positioning portion is configured to include the left bent piece and right bent piece, and the second positioning portion is configured to include the rear bent piece.

12. The waste bin device of an aircraft lavatory unit according to claim 5, wherein the chute has a rectangular bottom plate portion, the bottom plate portion has a front side disposed at a location near the removing and inserting opening, a rear side opposite from the front side, and a left side and right side that connect the front side and rear side, a rear recessed groove, left recessed groove, and right recessed groove respectively formed extending along three remaining sides, excluding the front side of the bottom plate portion, the waste container has a cross section that is rectangular, and has a front surface connected to the front plate portion through the connecting portion, a rear surface opposite from the front surface, and a left side surface and right side surface that connect the front surface and rear surface, a flange that detachably engages with the rear recessed groove, left recessed groove, and right recessed groove is formed along an upper edge of the remaining three side surface, excluding the front surface, the first positioning portion is configured to include a portion of the chute forming the left recessed groove and right recessed groove, and the first maintaining portion is configured to include the rear recessed groove, left recessed groove, right recessed groove, and flange that engages with the recessed grooves.

13. The waste bin device of an aircraft lavatory unit according to claim 9, wherein the waste container has a cross section that is rectangular, and has a front surface disposed at a location near the opening and closing plate, a rear surface opposite from the front surface, and a left side surface and right side surface that connect the front surface and rear surface, the chute has a rectangular bottom plate portion, the bottom plate portion has a front side disposed at a location near the opening and closing plate, a rear side opposite from the front side, and a left side and right side that connects the front side and rear side, a left bent piece and right bent piece respectively bent on the left side and right side downward from the sides so as to be able to contact the left side surface and right side surface of the waste container is formed to extend at the storing position, a rear bent piece, left bent piece, and right bent piece respectively bent downward from the remaining three sides of the bottom plate portion excluding the front side to as to be able to contact the rear surface, left side surface, and right side surface of the waste container are disposed at the storing position, the first positioning portion is configured to include the left bent piece and right bent piece, and the second positioning portion is configured to include the rear bent piece.

14. The waste bin device of an aircraft lavatory unit according to claim 10, wherein the waste container has a cross section that is rectangular, and has a front surface disposed at a location near the opening and closing plate, a rear surface opposite from the front surface, and a left side surface and right side surface that connect the front surface and rear surface, the chute has a rectangular bottom plate portion, the bottom plate portion has a front side disposed at a location near the opening and closing plate, a rear side opposite from the front side, and a left side and right side that connects the front side and rear side, a left bent piece and right bent piece respectively bent on the left side and right side downward from the sides so as to be able to contact the left side surface and right side surface of the waste container is formed to extend at the storing position, a rear bent piece, left bent piece, and right bent piece respectively bent downward from the remaining three sides of the bottom plate portion excluding the front side to as to be able to contact the rear surface, left side surface, and right side surface of the waste container are disposed at the storing position, the first positioning portion is configured to include the left bent piece and right bent piece, and the second positioning portion is configured to include the rear bent piece.

\* \* \* \* \*